(12) United States Patent
Pursifull

(10) Patent No.: US 9,422,900 B2
(45) Date of Patent: Aug. 23, 2016

(54) SYSTEM AND METHOD FOR CLOSING A TANK VALVE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 643 days.

(21) Appl. No.: 13/841,935

(22) Filed: Mar. 15, 2013

(65) Prior Publication Data
US 2013/0255636 A1 Oct. 3, 2013

Related U.S. Application Data

(63) Continuation-in-part of application No. 13/431,295, filed on Mar. 27, 2012, now Pat. No. 9,115,653.

(51) Int. Cl.
*F02M 21/02* (2006.01)
*F02M 47/00* (2006.01)
(Continued)

(52) U.S. Cl.
CPC ........... *F02M 47/00* (2013.01); *F02D 19/0613* (2013.01); *F02D 19/0623* (2013.01);
(Continued)

(58) Field of Classification Search
CPC . F02D 41/0025; F02D 41/0027; F02D 19/06; F02D 19/0602; F02D 19/0605; F02D 19/0613; F02D 19/0615; F02D 19/0623; F02D 19/0626; F02D 19/0628; F02D 19/0642; F02D 19/0647; F02D 19/0678

USPC ....... 123/525, 527, 575–578, 198 D, 198 DB, 123/457–458
See application file for complete search history.

(56) References Cited

U.S. PATENT DOCUMENTS 4,641,625 A * 2/1987 Smith ................. F02D 19/0628
123/27 GE
5,010,868 A * 4/1991 Clements ................ F02B 43/00
123/527

(Continued)

FOREIGN PATENT DOCUMENTS

| CN | 102076938 A | 5/2011 |
|---|---|---|
| GB | 2345729 A | 7/2000 |
| WO | 2006079173 A1 | 8/2006 |

OTHER PUBLICATIONS

Pursifull, Ross Dykstra, et al., "Enhanced Fuel Injection Based on Choke Flow Rate," U.S. Appl. No. 13/866,721, filed Apr. 19, 2013, 39 pages.

(Continued)

*Primary Examiner* — Thomas Moulis
(74) *Attorney, Agent, or Firm* — Julia Voutyras; Alleman Hall McCoy Russell & Tuttle LLP

(57) ABSTRACT

A method for closing a storage tank valve in response to leaks in a fuel line or fuel rail and emptying the tank of a vehicle when no leaks are detected is described. The method includes comparing a tank pressure to a fuel line or fuel rail pressure in order to detect leaks therein and further includes using a dedicated tank pressure sensor to measure the gaseous pressure of the storage tank, and thereby the amount of fuel remaining. In response to leaks in the fuel system, a controller may close an electronic solenoid valve, which reinforces a mechanical excess flow valve, to block the flow of fuel and prevent fuel loss from the gaseous storage tank.

8 Claims, 7 Drawing Sheets

(51) Int. Cl.
*F02D 19/06* (2006.01)
*F02D 41/00* (2006.01)
*F02D 41/22* (2006.01)

(52) U.S. Cl.
CPC ........ *F02D19/0626* (2013.01); *F02D 19/0628* (2013.01); *F02D 41/0027* (2013.01); *F02D 41/221* (2013.01); *F02M 21/0242* (2013.01); *F02D 2041/225* (2013.01); *F02D 2200/0602* (2013.01); *Y02T 10/32* (2013.01); *Y02T 10/40* (2013.01)

(56) References Cited

U.S. PATENT DOCUMENTS

| | | | | |
|---|---|---|---|---|
| 5,224,457 | A * | 7/1993 | Arsenault | F02B 43/00 123/27 GE |
| 5,370,097 | A * | 12/1994 | Davis | F02D 19/0631 123/27 GE |
| 5,377,645 | A * | 1/1995 | Moore | F02B 43/00 123/478 |
| 5,450,829 | A * | 9/1995 | Beck | F02D 19/0631 123/435 |
| 5,483,943 | A | 1/1996 | Peters | |
| 5,611,316 | A * | 3/1997 | Oshima | F02M 21/0224 123/494 |
| 5,615,702 | A | 4/1997 | Dawans et al. | |
| 5,632,250 | A | 5/1997 | Kato et al. | |
| 5,690,078 | A * | 11/1997 | Ofner | F02M 21/0212 123/27 R |
| 5,755,210 | A * | 5/1998 | Sato | F02B 43/00 123/518 |
| 5,762,087 | A * | 6/1998 | Khadim | F16K 39/024 137/1 |
| 6,009,860 | A * | 1/2000 | Brown | F02D 17/04 123/198 DB |
| 6,016,834 | A * | 1/2000 | Leidl | B60K 15/01 137/102 |
| 6,145,494 | A | 11/2000 | Klopp | |
| 6,202,688 | B1 * | 3/2001 | Khadim | F16K 1/305 137/599.08 |
| 6,240,910 | B1 | 6/2001 | Maekawa et al. | |
| 6,314,948 | B1 | 11/2001 | Cathcart | |
| 6,390,075 | B1 | 5/2002 | Yamazaki et al. | |
| 6,405,947 | B2 | 6/2002 | Fochtman | |
| 6,435,165 | B1 * | 8/2002 | Hill | F02D 7/02 123/479 |
| 6,708,718 | B2 | 3/2004 | Yamada et al. | |
| 7,222,015 | B2 * | 5/2007 | Davis | F02D 19/027 701/103 |
| 7,287,519 | B2 | 10/2007 | Harrison | |
| 7,325,561 | B2 | 2/2008 | Mathison et al. | |
| 7,367,312 | B1 | 5/2008 | Boyer et al. | |
| 7,870,849 | B2 * | 1/2011 | Ceratto | F02D 41/0027 123/527 |
| 8,166,953 | B2 | 5/2012 | Caley | |
| 8,439,016 | B2 * | 5/2013 | Carter | F02D 41/0027 123/456 |
| 8,516,998 | B2 * | 8/2013 | Long | F02M 21/0212 123/527 |
| 8,833,341 | B2 * | 9/2014 | Wong | F02D 17/02 123/41.2 |
| 8,903,630 | B2 * | 12/2014 | Pursifull | F02D 19/0615 123/431 |
| 8,997,720 | B2 * | 4/2015 | Brown | F02M 63/029 123/525 |
| 2001/0003977 | A1 * | 6/2001 | Hayashi | F02D 41/0027 123/480 |
| 2003/0230249 | A1 * | 12/2003 | Yamaoka | F02M 37/20 123/1 A |
| 2004/0139944 | A1 | 7/2004 | Nakano et al. | |
| 2004/0144371 | A1 | 7/2004 | Jauss | |
| 2005/0284451 | A1 * | 12/2005 | Uhde | F02D 13/0203 123/525 |
| 2006/0246177 | A1 | 11/2006 | Miki et al. | |
| 2007/0000563 | A1 | 1/2007 | Handa | |
| 2008/0099002 | A1 * | 5/2008 | Boyer | F02D 41/0027 123/679 |
| 2009/0055077 | A1 | 2/2009 | Schule | |
| 2009/0150050 | A1 * | 6/2009 | Mashida | F02D 19/0631 701/103 |
| 2010/0242921 | A1 * | 9/2010 | Harper | F16K 17/04 123/506 |
| 2010/0294250 | A1 * | 11/2010 | Jauss | F02D 19/0647 123/511 |
| 2010/0307454 | A1 | 12/2010 | Ulrey et al. | |
| 2012/0143480 | A1 | 6/2012 | Pursifull | |
| 2013/0014729 | A1 * | 1/2013 | Saito | F02D 41/0025 123/458 |
| 2013/0104997 | A1 * | 5/2013 | Harper | F17D 3/01 137/12 |
| 2013/0199499 | A1 | 8/2013 | Pursifull | |

OTHER PUBLICATIONS

Anonymous, "In-Situ Automotive Gaseous Fuel System Leak Check Method," IPCOM No. 000124730, Published May 4, 2005, 2 pages.
Partial Translation of Office Action of Chinese Application No. 2013100988030, Issued Jun. 3, 2016, State Intellectual Property Office of PRC, 8 Pages.

* cited by examiner

SYSTEM AND METHOD FOR CLOSING A TANK VALVE

CROSS REFERENCE TO RELATED APPLICATIONS

The present application is a continuation-in-part of U.S. patent application Ser. No. 13/431,295 filed Mar. 27, 2012, the entire contents of which are incorporated herein by reference for all purposes.

FIELD

The present description relates to a system and method for closing a storage tank valve of a vehicle when leaks are detected in the fuel system. The system and method may be particularly useful for restricting the flow of fuel from tanks that are pressurized.

BACKGROUND AND SUMMARY

A vehicle may include a pressurized tank that holds fuel or some other gaseous substance that is used while the vehicle operates. For example, some vehicles operate using fuel supplied from a pressurized tank wherein the fuel is stored under pressure so a greater quantity of fuel may be stored in the tank. Downstream of the tank, a pressure regulator and valves are often included to reduce the pressurized gas to a more suitable pressure for introduction to the engine, and the pressurized gas may be introduced to an engine via delivery conduits including a manifold such as a fuel rail.

Because the gaseous contents of the storage tank are stored under pressure, a breach of the system to atmospheric pressure may result in a pressure differential producing a net flow of gaseous fuel from the storage tank to the region of the leak. For this reason, vehicles often include leak identification modes to enable the engine to continue operating when a fuel supply system incurs a significant leak in the system. One example is shown by U.S. Pat. No. 6,314,948 that describes a means of detecting the air rail pressure to determine whether a loss or significant reduction in the air pressure delivered to the fuel and air rails has occurred.

The inventors herein have recognized disadvantages with such approaches and developed a method for closing a tank valve in response to potential leaks in the gaseous fuel system. By comparing a tank pressure to one or more of a fuel rail pressure and a fuel line pressure, it is possible to detect leaks in the gaseous fuel system in a manner that allows accurate identification of degradation in the fuel system from the injector to the fuel tank while still enabling increased usage of gaseous fuel in the tank even at low pressures. Then, the method includes overriding the gaseous fuel supplying based on an overly high gaseous fuel tank pressure and an insufficient gaseous rail pressure and closing the storage tank valve in response to the detected leak when one or more of a fuel rail pressure or fuel line pressure falls below a lower threshold while a tank pressure is higher than an upper threshold.

In one particular example, based on a pressure difference between the tank and, for example, a high-pressure sensor in the fuel line being above a threshold, the method further includes closing the tank valve and switching the source of fuel. For example, a vehicle that operates on both gaseous and liquid fuels may switch from operating solely on a gaseous fuel to operating solely on a liquid fuel when a leak develops in the gaseous fuel system. If the engine were to continue operating while gaseous fuel was delivered from the storage tank, the engine might operate leaner than is desired because there might be an insufficient flow rate of fuel from the tank to the engine.

The present description may provide several advantages. In particular, the approach may be applicable to different types of fuel injection systems and gases. Further, the present description provides an operating mode based on the amount of fuel stored in order to reduce the loss of fuel. Therefore, the approach may reduce the amount of gaseous fuel that may be vented into the atmosphere if a leak develops in a gaseous fuel system. In addition, when no leaks are detected, the engine system functions as designed, and the system further allows for: solely supplying a gaseous fuel to an engine when a pressure of the gaseous fuel is greater than a threshold tank pressure; and supplying the gaseous fuel and a liquid fuel when the pressure of the gaseous fuel is less than the threshold tank pressure. By supplying liquid fuel and gaseous fuel to an engine when a pressure of a tank is less than a threshold tank pressure, it may be possible to draw additional gas from the storage tank while providing liquid fuel to the engine so that the engine does not misfire or operate richer than is desired. In this way, the gaseous fuel tank may be evacuated of a pressurized gas while the engine provides acceptable performance in a manner that extends the operating time or range of the vehicle and engine since the gaseous tank may be more completely evacuated.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
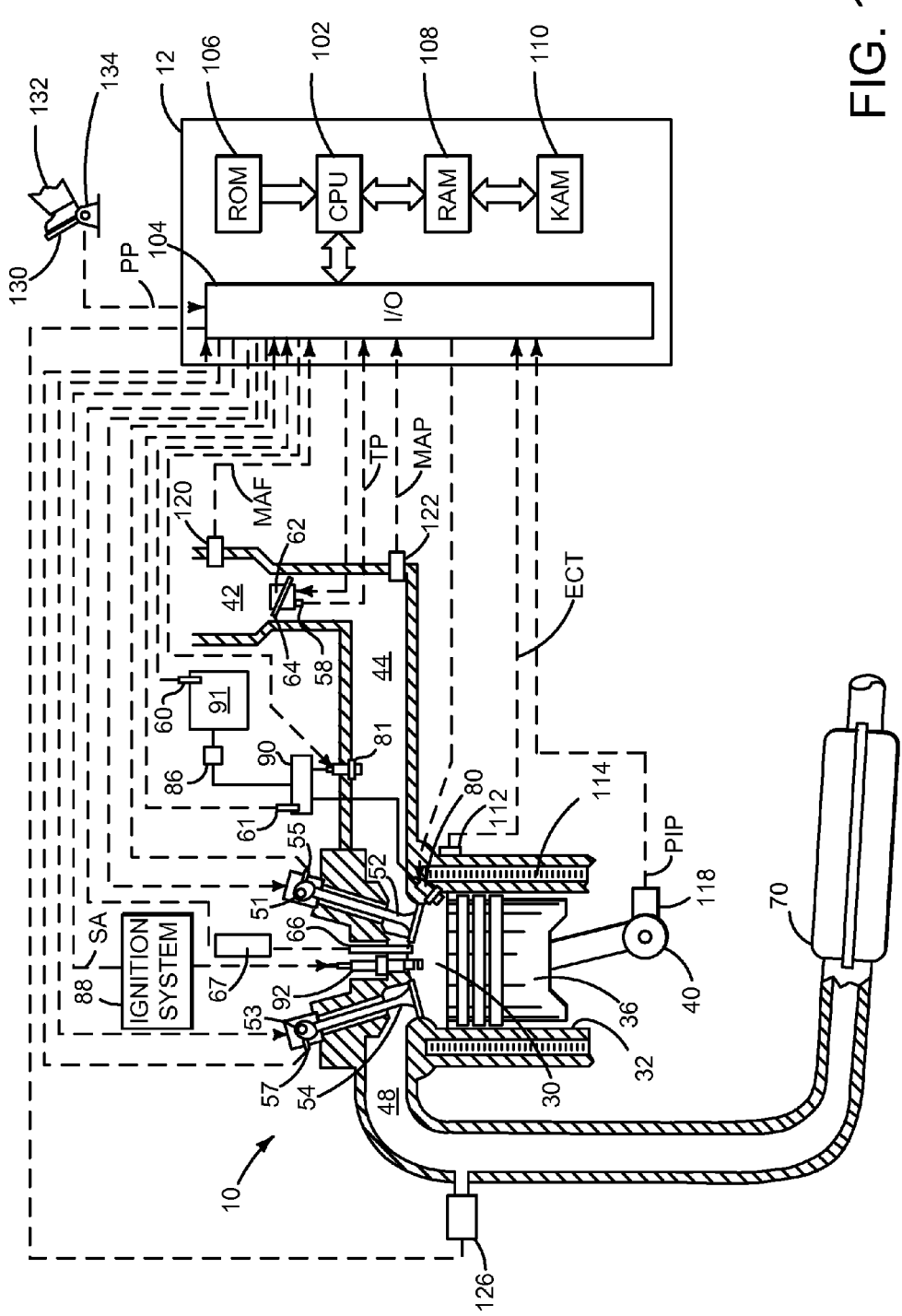
FIG. 1 is a schematic diagram of an engine.
Figure 2:
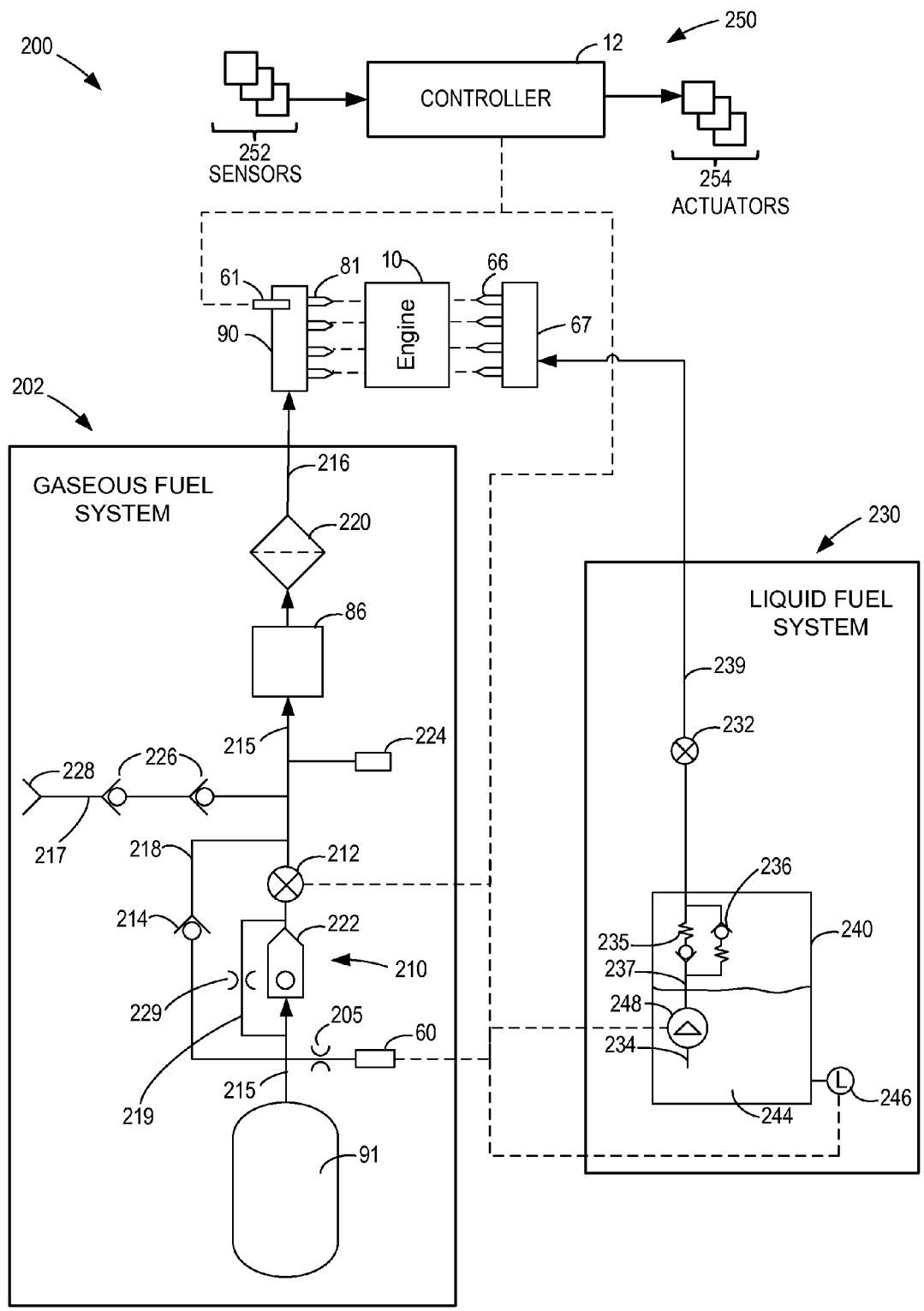
FIG. 2 is a schematic diagram of a bi-fuel delivery system capable of selectively delivering gaseous and liquid fuels to an engine.
Figure 3:
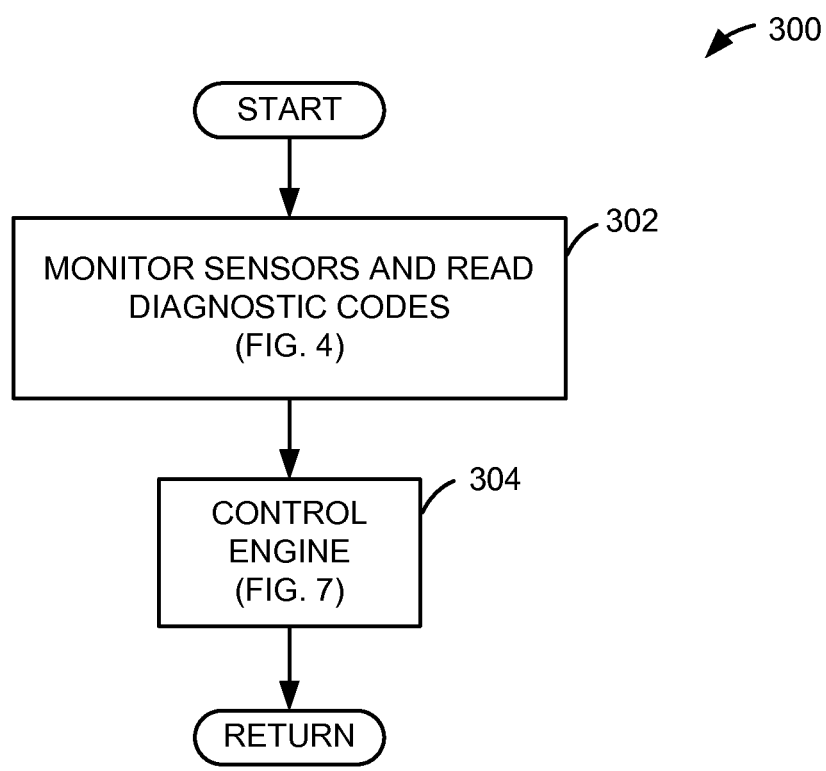
FIG. 3 is a flow chart of an example method illustrating how a controller manages both engine and fuel delivery systems.
Figure 4:
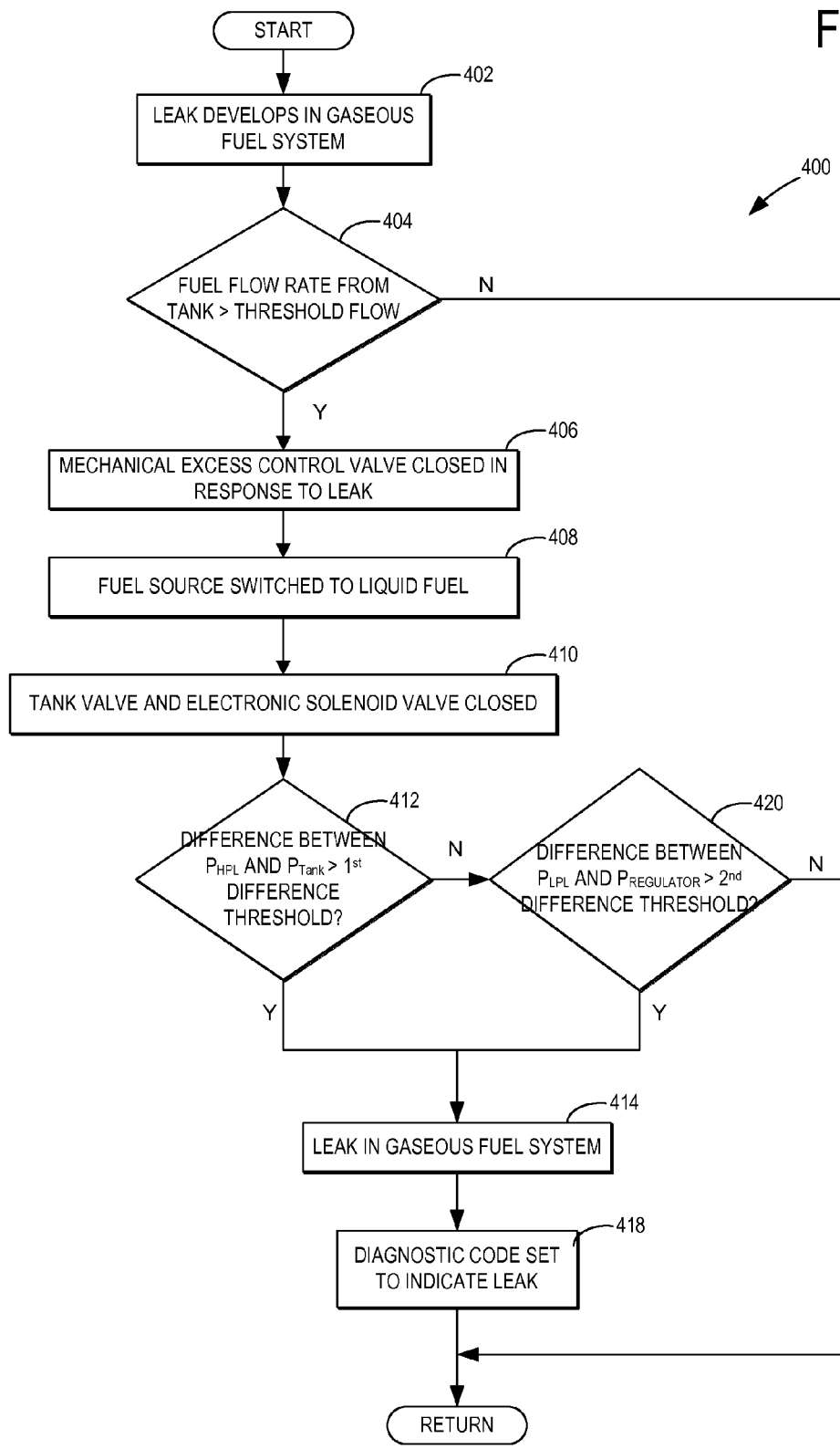
FIG. 4 is a flow chart of an example method for closing a tank valve in response to a leak in the gaseous fuel delivery system.

The present description is related to a method for closing a tank valve in response to a leak in a bi-fuel delivery system that includes a pressurized gas aboard a vehicle. In one non-limiting example, the tank may be filled with a fuel such as compressed natural gas as illustrated in FIG. 1. FIG. 2 then shows a fuel storage tank with a pressure sensor coupled thereto whose placement within the fuel system enables leak detection in the manner described herein. In FIG. 3, the engine system further includes a controller capable of managing both engine operations and diagnostic procedures according to the method, which, as shown in FIG. 4, includes detecting leaks within the fuel delivery system based on pressure measurements and closing the tank valve when a leak is detected. When no leaks are detected, the fuel system functions as designed and the tank may be emptied as described in the simulated sequences provided in FIGS. 5 and 6. In one example, an engine may be operated to increase extraction of gas vapors from the tank so the tank may be more thoroughly emptied. The method of FIG. 7 therefore provides for improving the evacuation of tanks in direct fuel injection engines as well as in port fuel injected engines.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Direct liquid fuel injector 66 is shown positioned to inject liquid fuel directly into combustion chamber 30, which is known to those skilled in the art as direct injection. Alternatively, liquid fuel may be injected to an intake port, which is known to those skilled in the art as port injection. Direct liquid fuel injector 66 delivers liquid fuel in proportion to the pulse width from controller 12. Fuel injector 66 receives liquid fuel via fuel rail 67 that is delivered by liquid fuel supply system 230 that includes a fuel tank, fuel pump, and fuel rail.

Direct gaseous fuel injector 80 is shown positioned to inject gaseous fuel directly into combustion chamber 30. Direct gaseous fuel injector 80 may be configured to deliver either liquid or gaseous fuel. Port gaseous fuel injector 81 is shown positioned to inject gaseous fuel into intake manifold 44. In some examples, port gaseous fuel injector 81 may be positioned in an intake port of a cylinder head. In other examples, gaseous fuel injector 81 may inject gaseous fuel into a central area of an intake manifold. Both direct gaseous fuel injector 80 and port gaseous fuel injector 81 may provide gaseous fuel to engine 10. However, gaseous fuel may be supplied solely via direct gaseous fuel injector 80 without port gaseous fuel injector 81 in other examples. Additionally, gaseous fuel may be supplied solely via port gaseous fuel injector 81 without direct gaseous fuel injector 80 in still other examples. In general, bi-fuel delivery systems are configured so liquid fuel is directly injected into combustion chamber 30 while gaseous fuel is port injected into intake manifold 44.

Direct gaseous fuel injector 80 and port gaseous fuel injector 81 receive gaseous fuel via fuel rail 90 and fuel tank 91. Pressure regulator 86 controls the pressure delivered to fuel rail 90 by fuel tank 91. Pressure of gas in fuel tank 91 is sensed via pressure sensor 60. Pressure of gas in fuel rail 90 is sensed via pressure sensor 61. Direct gaseous fuel injector 80 and port gaseous fuel injector 81 may be controlled independently by controller 12 so that each delivers different flow rates at different times.

Intake manifold 44 is shown communicating with optional electronic throttle 62 that adjusts a position of throttle plate 64 to control air flow from air intake 42 to intake manifold 44. Electronic throttle 62 is shown positioned in between intake manifold 44 and air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft.

Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows an example embodiment of a bi-fuel delivery system capable of selectively delivering both gaseous fuel and liquid fuel via dual or multi fuel rails to a plurality of fuel injectors of an internal combustion engine. Although dual fuel rails are shown in the example fuel delivery system, in some embodiments, the bi-fuel delivery system may have a single fuel rail to deliver both gaseous and liquid fuels. Fuel supply system 200 comprises gaseous fuel supply system 202, liquid fuel supply system 230, and fuel rails 67 and 90. Fuel rail 90 connects gaseous fuel supply system 202 to injectors 81, and fuel rail 67 connects liquid fuel supply system 230 to injectors 66 where, as a non-limiting example, injectors 66 and 81 may deliver fuel to different cylinders of engine 10.

Gaseous fuel supply system 202 includes a gaseous fuel source, which in the example embodiment is compressed natural gas (CNG). However, the fuel source is non-limiting and a different fuel source may be used. Gaseous fuel supply system 202 includes gaseous fuel tank 91 and excess flow valve 210 (EFV). Gaseous fuel tank 91 may be a pressurized gas fuel tank containing gaseous fuel at high pressure, where "high pressure" is a pressure greater than the pressure of liquid fuel as it enters fuel rail 90. Pressure sensor 60 may measure the pressure within gaseous fuel tank 91 and communicate the data to electronic control unit (ECU) 250, which may be controller 12. In some embodiments, pressure sensor 60 may be placed near fuel tank 91 while in other embodiments it may be attached to the tank. Pressure sensor 60 may be further coupled to orifice 205, which is an orifice that limits leaks if the pressure sensor is removed, for example when the sensor is replaced. In some embodiments, the fuel tank pressure may be inferred from a high pressure line pressure sensor, e.g. pressure sensor 224, within gaseous fuel supply system 202.

Excess flow valve 210, is coupled to gaseous fuel tank 91 by fuel supply line 215, which is a high-pressure fuel supply line. Pressure sensor 224 is coupled to fuel supply line 215 and measures the pressure of gas within the high-pressure fuel supply line. Pressure regulator 86 downstream of fuel tank 91 controls the pressure delivered to fuel rail 90. Downstream of pressure regulator 86 is fuel supply line 216, which may be a low-pressure fuel line that couples high-pressure fuel supply line 215 to fuel rail 90. Therefore, pressure regulator 86 separates the passage into a high pressure region and a low pressure region. In some embodiments, pressure regulator 86 may include a solenoid operated open/close valve at either an inlet or outlet of the pressure regulator 86. Compared to high-pressure fuel supply line 215, fuel supply line 216 is a low-pressure line, however the pressure of gas in fuel supply line 216 may sometimes be relatively high, for example, after pressure regulator 86 delivers gas from fuel tank 91 into the low-pressure supply line. Then, once the gas in fuel supply line 216 has been injected into engine 10, the pressure in fuel supply line 216 may again return to a relatively low value compared to the pressure in fuel supply line 215. In this way, the pressure in fuel supply line 216 may continuously reciprocate as fuel from fuel tank 91 is injected into engine 10. Within fuel supply line 216 is coalescing filter 220 that acts to purify the gaseous fuel by filtering out debris particles and oil mist as the gaseous fuel stream moves down the fuel line from fuel tank 91.

Excess flow valve 210 controls the flow of gaseous fuel from gaseous fuel tank 91 and is coupled to ECU 250. Excess flow valve 210 may be comprised of a self-actuating mechanical EFV 222 that may automatically reset once a leak is repaired. However, because excess flow valve 210 also has a bypass bleed orifice 229 located in line 219, a small leak flow may be present when tripped. As such, the mechanical EFV may reduce the flow of fuel from the tank and not entirely shut it off. Once the leak is repaired, the leak flow through bleed orifice 229 slowly re-pressurizes the downstream volume and therefore automatically resets the EFV. The ability to automatically reset makes the EFV one of the self-resetting types. In order for the line to be re-pressurized, enough gas must be present in the tank to recharge the fuel line.

The tank valve assembly may further include electronic solenoid valve 212, which is included and completely shuts off the flow of gas. The excess flow valve shuts off fuel flow from the tank if the flow exceeds a threshold indicating a maximum allowable flow of fuel to the engine. Because electronic solenoid valve 212 is a mechanical device, it has a single setting that is set to trip when a flow of fuel to the engine is above an upper allowable engine fuel flow rate. In some embodiments, the tank valve assembly may also include check valve 214, which allows refueling when solenoid valve 212 is closed. In another example embodiment, excess flow valve 210 may omit the check valve and be a solenoid valve 212 controlled by ECU 250. In yet another embodiment (not shown), gaseous fuel supply system 202 may be supplied with different gaseous fuel sources, such as a source of vaporized liquid fuel.

Gaseous fuel supply system 202 is comprised of fill receptacle 228 that allows fuel tank 91 to be re-filled with fuel through fuel line 217. Two redundant one-way check valves 226 are also included in fuel line 217 to prevent the flow of gaseous fuel from fuel supply line 215 to the atmosphere external to the gaseous fuel system. The redundancy is included to seal the gaseous fluid in the event a check valve is held open, for example, by being frozen open. Gaseous fuel is added at fill receptacle 228 and flows through fuel line 217 to fuel supply line 215 and further through fuel line 218 where one-way check valve 214 is oriented in a manner that allows the flow from fill receptacle 228 to gaseous fuel tank 91 and prevents the flow from gaseous fuel tank 91.

Turning now to the liquid fuel system, liquid fuel supply system 230 includes a liquid fuel source, valve 232, check valve 235, and pressure relief valve 236. In the example embodiment, the liquid fuel source includes liquid fuel tank 240 filled with liquid fuel 244, fuel level sensor 246, and fuel pump 248. Liquid fuel 244 may be drawn into fuel pump 248 from inlet 234 and pumped into supply line 237. Fuel pump 248 is controlled by ECU 250. An optional high-pressure pump, controlled by ECU 250, may be inserted downstream from fuel pump 248 to increase the liquid fuel pressure entering fuel rail 67. Fuel level sensor 246 may be a liquid level sensor, which may detect the storage amount in fuel tank 240 and communicate the storage amount to ECU 250. Liquid fuel tank 240 may also include a vent for letting air or fuel vapor at atmospheric pressure flow into and out of the tank.

A one-way check valve 235 is present between the liquid fuel source and valve 232 to prevent liquid fuel from flowing back to the liquid fuel source when liquid fuel is being delivered to fuel rail 67. Pressure relief valve 236, connected between the liquid fuel source and valve 232, provides a return path for liquid fuel forced out of fuel rail 67. When the return path of pressure relief valve 236 is routed back to the pump inlet as shown in FIG. 2, the pressure may be relieved when fuel pump 248 is off or operating at partial voltage/speed/pressure. However, in some embodiments, the return path of pressure relief valve 236 may be routed back to the tank's interior indicated by liquid fuel 244. In this configuration, pressure relief valve 236 may be coupled to the pressure at the inlet to solenoid valve 232. The threshold for pressure relief valve 236 to open may be greater than the pressure generated by the liquid fuel source and less than the minimum pressure for gaseous injection. Pressure relief valve 236 is closed when liquid fuel flows from the liquid fuel source to fuel rail 67. In the example embodiment, valve 232 comprises a float valve. The float valve contains a ball that floats in liquid fuel, but sinks in gaseous fuel. When the ball in the float valve sinks, it blocks the path through the valve, and the valve is closed. Liquid fuel may flow through the float valve, but gaseous fuel cannot flow through the float valve. In other embodiments, valve 232 may be a solenoid valve controlled by ECU 250. In another embodiment, valve 232 may be combined into a single valve feeding the fuel rail. In yet another embodiment, valve 232 may be a check valve, a liquid fuel accumulator may be attached to fuel rail 67, and pressure relief valve 236 may be omitted.

In FIG. 2, fuel supply system 200 comprises fuel rail 67 with an inlet for liquid fuel from supply line 239, and fuel rail 90 with an inlet for gaseous fuel from fuel supply line 216, and pressure sensor 61 for communicating pressure of the fuel rail to ECU 250. Fuel rails are often tube-like and thus, depending on vehicle inclination, the fuel rail is preferred to have a drain on each end to enable draining of liquid fuel from the fuel rail. Fuel supply line 216 connects the output of gaseous fuel supply system 202 to fuel rail 90. Fuel injectors 81 are mounted on the top of fuel rail 90, such that the intake nozzles of the fuel injectors face at least partially toward the surface. In some embodiments, fuel injectors mounted above the fuel rail may first use the gaseous (or vapor) fuel while fuel injectors mounted below the fuel rail first use the liquid fuel.

When fuel injectors 66 are injecting liquid fuel, fuel pump 248 and optional high pressure pump are on, valve 232 is open, and pressure relief valve 236 and excess flow valve 210 are closed. Liquid fuel flows from liquid fuel tank 240 into inlet 234 and through supply lines 237 and 239 to fuel rail 67. Fuel rail 67 is filled with pressurized liquid fuel which may be injected by fuel injector 66 in proportion to the pulse width of signal FPW-2 received from controller 12.

When fuel injectors 81 are injecting gaseous fuel, fuel pump 248 and the optional high pressure pump may be off, valve 232 is closed, and excess flow valve 210 is open. Gaseous fuel flows from gaseous fuel tank 91 through fuel supply lines 215 and 216 into fuel rail 90. Fuel rail 90 is filled with pressurized gaseous fuel which may be injected by fuel injector 81 in proportion to the pulse width of signal FPW-2 received from controller 12.

In order to transition from liquid fuel to gaseous fuel, fuel pump 248 and the optional fuel pump are disabled and excess flow valve 210 is opened. In some embodiments where a single fuel rail is used to inject both fuels, during the transition, the fuel rail may contain gaseous fuel and liquid fuel concurrently. High pressure gaseous fuel flows into and rises to the top of the fuel rail. The position and orientation of injectors, on top of fuel rail, speed the transition from liquid fuel to gaseous fuel because the rising gaseous fuel is preferentially delivered to the injectors. Injection of gaseous fuel by the fuel injector may begin even before the fuel rail is entirely purged of liquid fuel. Applying high pressure gaseous fuel forces liquid fuel to flow from the fuel rail back to liquid fuel tank 240 through the path containing pressure relief valve 236. The transition is finished when gaseous fuel reaches float valve 232. Float valve 232 seals when it is drained of liquid fuel, preventing gaseous fuel from entering liquid fuel supply system 230.

Conversely, to transition from gaseous fuel to liquid fuel in the example system having a single fuel rail, excess flow valve 210 is closed and fuel pump 248 and the optional fuel pump are turned on. The remaining gaseous fuel in the fuel rail is delivered to the injectors as liquid fuel flows into the fuel rail. The gaseous fuel is purged from fuel rail quickly because the fuel rail holds a small mass of gaseous fuel compared to liquid fuel.

The various components described above with reference to FIG. 2 may be controlled by ECU 250, which includes a controller 12 with computer readable instructions for carrying out routines and subroutines for regulating vehicle systems, a plurality of sensors 252, and a plurality of actuators 254.

FIG. 3 is a flow chart of example method 300 illustrating how controller 12 may monitor sensors (e.g. pressure sensor 60) and read diagnostics codes within the system to determine the amount and types of fuel delivered to engine system 10. At 302, method 300 includes a means of monitoring sensors within fuel supply system 200. For example, pressure sensor 60 may measure the pressure within gaseous fuel tank 91 while pressure sensor 224 measures the pressure within high-pressure fuel supply line 215. Each of these sensors may then communicate the data to controller 12, which may further use the information to determine if a leak exists in the high-pressure supply line. If a leak is detected, controller 12 may set a diagnostic code indicative of the leak and store the code status into memory for communication to a vehicle occupant. If no leak is detected at 302, gaseous fuel supply system 202 may continue to operate as designed and method 300 proceeds to 304.

At 304, method 300 includes using controller 12 to determine the engine operating conditions. Then, based on the conditions detected, controller 12 can deliver either gaseous or liquid fuel, or a combination thereof, to fuel rails in order to power engine 10. For example, an engine with a high intake manifold pressure may indicate that the engine is being operated at a higher engine load. To accommodate the engine load, controller 12 may adjust the amount of gaseous fuel injected into the engine intake manifold or cylinder intake port in response to the engine intake manifold pressure so the desired engine torque is provided. After adjusting engine operations, method 300 may continue to monitor the engine system and make further adjustments in response to sensors within the engine system.

FIG. 4 shows a flow chart of example method 400 that closes a tank valve in response to leaks detected in the gaseous fuel delivery system. For example, a fuel line leak may result in the high-pressure plumbing circuit of a vehicle being breached to atmospheric pressure. As a result, the fuel flow rate from the storage tank may increase as gaseous fuel stored at a higher pressure flows to the region of the leak having a lower pressure. Although in the presence of a leak some of the gaseous fuel may still be distributed to the injectors of the engine, some gaseous fuel may also be removed from the fuel system. Therefore, fuel delivery systems often come equipped with an excess flow valve that closes to reduce the flow of escaping gas when a leak is present. For this reason, the flow valve described herein includes an electronic solenoid valve coupled to a mechanical excess flow valve to restrict the flow of fuel when a leak is detected in the gaseous fuel system.

At 402, a leak in the gaseous fuel system develops that causes a pressure differential. In response to the pressure differential, gaseous fuel may flow from the tank and thereby reduce the mass of fuel contents stored. For example, a fuel fill receptacle may be frozen open which causes fuel to leak from the system if an EFV does not trip to restrict the flow of fuel from the tank. In response to a leak in the system, method 400 includes monitoring sensors within the fuel delivery system. For example, controller 12 may receive data from pressure sensor 61 within the fuel rail, or pressure sensor 60 located near the storage tank. Based on the data received, controller 12, which includes a microprocessor unit and various memory units, may be programmed to make adjustments based on a leak in the fuel delivery system.

At 404, method 400 includes measuring the fuel flow rate from the tank and comparing the measured rate to a threshold flow selected to indicate possible leaks in the system. For example, a leak in low-pressure fuel supply line 216 may cause the pressure measured by pressure sensor 61 to decrease. This drop in pressure may cause the fuel injectors 81 to remain open longer, which in turn, may cause pressure regulator 86 to respond by increasing the fuel flow from the tank in order to boost the pressure of the fuel supplied to the injectors.

At 406, a fuel flow rate above a threshold causes the excess flow valve to slam shut, which restricts the flow of fuel from the tank. Then, at 408, controller 12 may switch the source of fuel to liquid fuel in response to a drop in injection pressure that results from the restricted flow of gaseous fuel. If the mechanical EFV is self-actuating, which means it can automatically reset once a leak is repaired, the valve may still have a small leak flow when tripped. As such, the mechanical EFV may substantially reduce the flow of fuel from the tank and not entirely shut it off. Therefore, to ensure no further fuel is lost from the storage tank, at 410, a tank valve and/or a regulator valve is closed by controller 12. Returning to 404, if the measured fuel flow from the tank is below the threshold flow, controller 12 may determine that the fuel delivery system is operating as designed and continue monitoring sensors within the fuel system.

In order to confirm the presence of a leak in the gaseous fuel system, method 400 further uses pressure data from sensors in the system to diagnose the leak. Therefore, at 412, method 400 includes comparing the pressure in the high-pressure fuel supply line ($P_{HPL}$) to the pressure of the gas in the tank ($P_{Tank}$) in order to determine whether a leak has developed in the high-pressure fuel supply line. For example, if a hole is blown in the high-pressure fuel line, e.g. fuel supply line 215, then the pressure measured downstream from the tank may be reduced as some of the gas escapes from the fuel delivery system. As such, the pressure measured by pressure sensor 224 in the fuel line may be substantially lower than the pressure of the tank measured by pressure sensor 60. If the fuel line pressure $P_{HPL}$ stays below a first lower threshold while the tank pressure $P_{Tank}$ is above an upper threshold such that the difference between $P_{HPL}$ and $P_{Tank}$ is greater than a first difference threshold, at 414, the method identifies a leak in the fuel supply line and sets a diagnostic code to indicate the leak at 418. When a leak is confirmed in the gaseous fuel system, the tank valve and solenoid valve may remain closed until the vehicle is serviced or, in some instances, the vehicle is keyed-on again.

Returning to 412, if $P_{HPL}$ is substantially equal to $P_{Tank}$, the method continues to monitor pressure data from the fuel rail to determine the presence of a leak in the system. As such, at 420, method 400 includes comparing the pressure in the low-pressure fuel line ($P_{LPL}$) to the regulated fuel pressure setting ($P_{Regulator}$). For instance, if the difference between the low-pressure fuel line pressure $P_{LPL}$ and the regulated pressure $P_{Regulator}$ is greater than a second difference threshold, the presence of a leak in the system is confirmed. Furthermore, if $P_{LPL}$ is lower than $P_{Regulator}$, the leak can be isolated to the low-pressure fuel line, for example, in fuel supply line 216 or fuel rail 90. However, if $P_{LPL}$ is greater than $P_{Regulator}$, the leak may exist in the high-pressure region. As one example, if a pressure regulator diaphragm rips, then the pressure in the fuel rail may increase as gaseous contents flow to the fuel rail, which may also cause damage to the injectors in some instances. Therefore, method 400 can also be used to reduce damages within the fuel system. If the difference between the fuel line pressure $P_{LPL}$ and $P_{Regulator}$ remains, at 414, the method identifies a leak in fuel supply line and sets a diagnostic code to indicate the leak at 418. In the same manner as described above with respect to box 412, when a leak is confirmed in the gaseous fuel system, the tank valve and solenoid valve may remain closed until the vehicle is serviced or keyed-on again.

At 420, if $P_{HPL}$ and $P_{LPL}$ are substantially equal to $P_{Tank}$ and $P_{Regulator}$, respectively, then method 400 may continue to operate as designed even though an EFV was tripped. Method 400 offers advantages in that the leak detection system can be automatically reset in the event an EFV trips when no leak is actually present in the system.

Turning to the method for emptying a pressurized tank aboard a vehicle, in order to run the tank to empty, controller 12 may include instructions for over-riding the various safety features described that close the tank valve in response to a leak. As such, when the actual or inferred tank pressure is below a threshold tank pressure, the contents of a tank can still be emptied by the methods below. However, in order to bleed the tank dry, the fuel rail pressure may sometimes fall below the regulated pressure, which presents problems for method 400 that may interpret a low fuel rail pressure as a leak that triggers a solenoid valve to close. Therefore, in order to empty the contents of the tank, controller 12 may also have the ability to over-ride the leak detection system and keep the tank valve open, which thereby allows the tanks contents to be emptied in the manner described.

Figure 5:
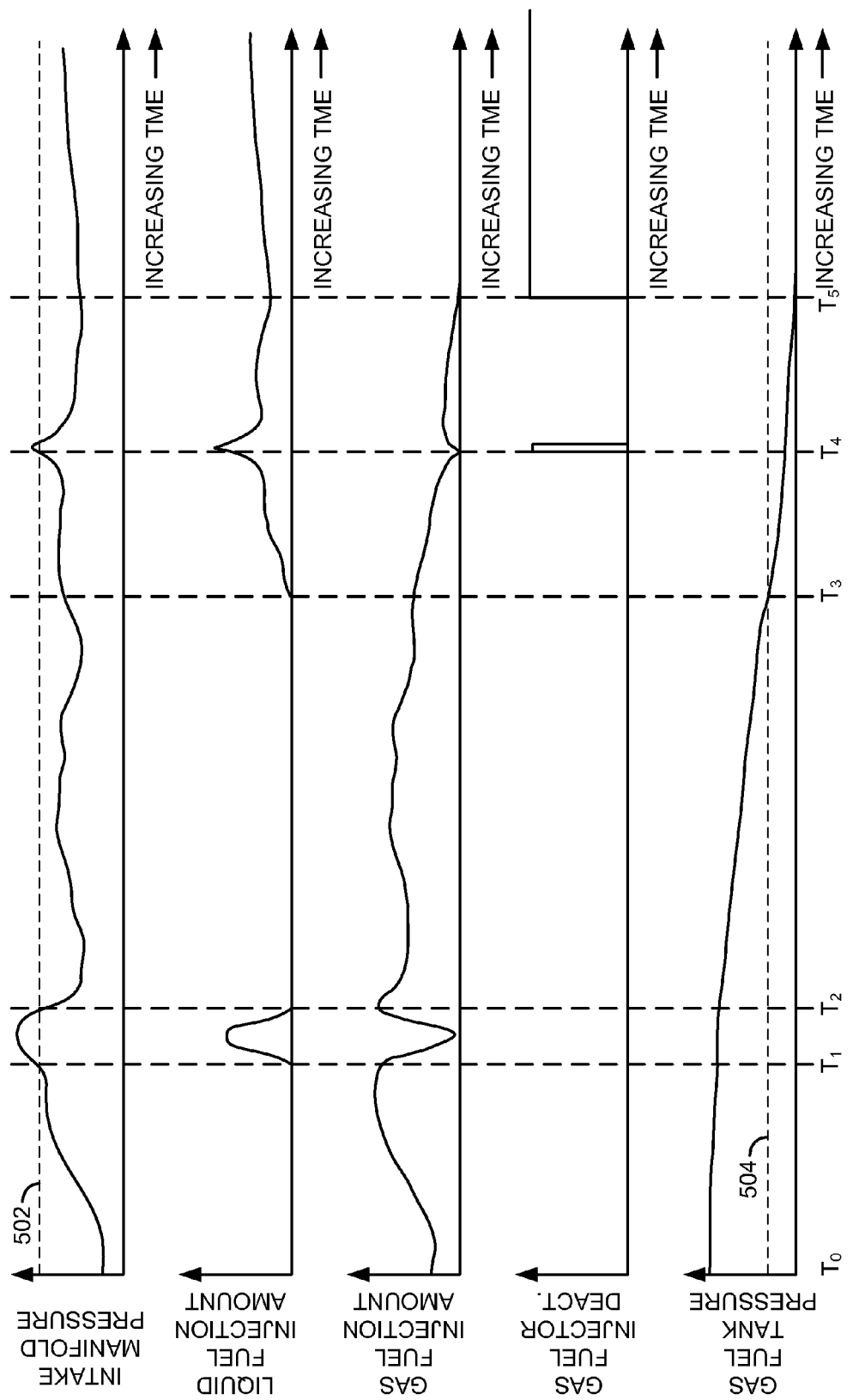
FIGS. 5 and 6 show simulated operating sequences according to the method of FIG. 7.
Figure 7:
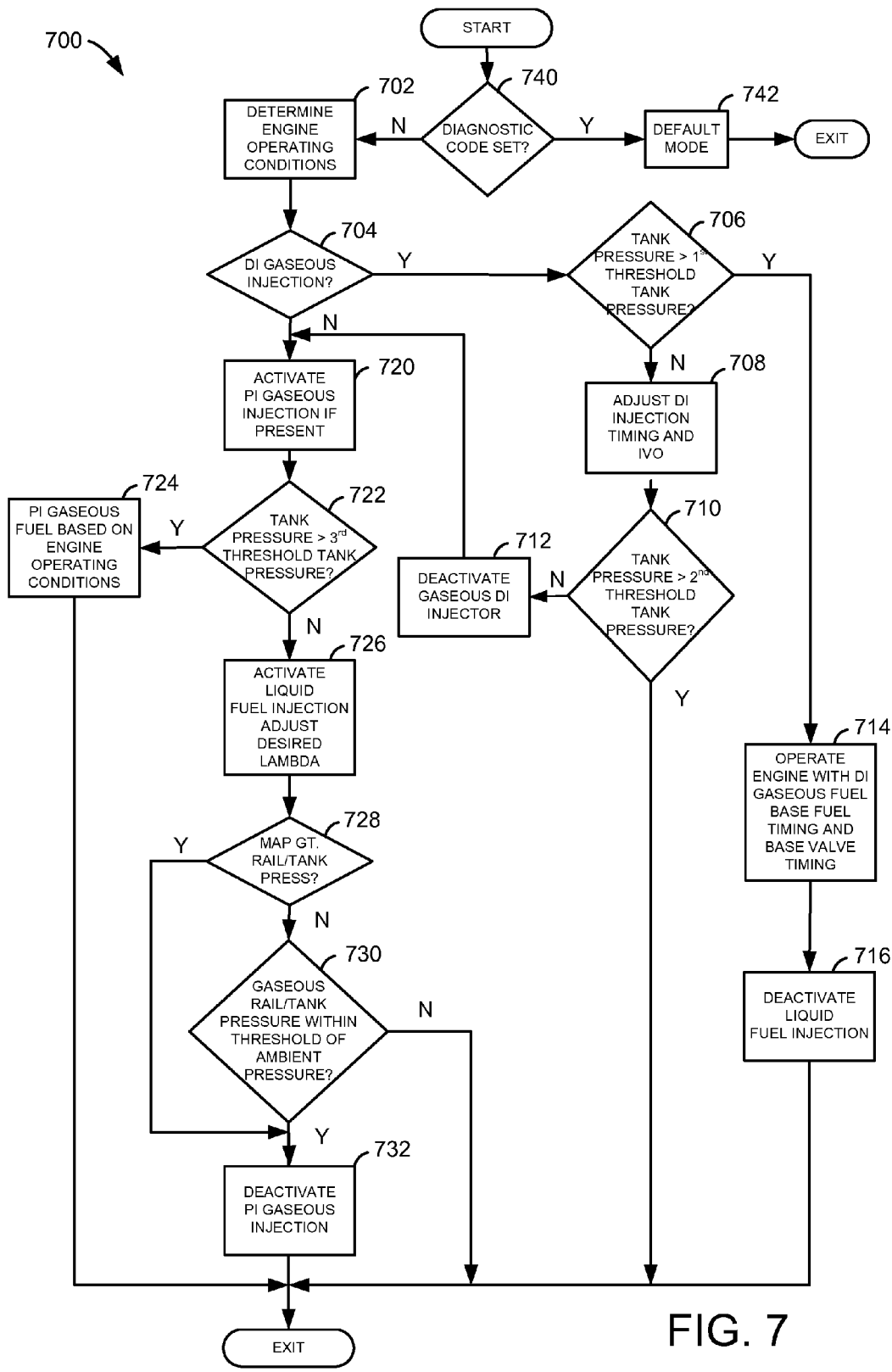
FIG. 7 is a flow chart of an example method for emptying a pressurized tank aboard a vehicle.

FIG. 5 shows a simulated operating sequence according to the method of FIG. 7 when the engine has port gaseous fuel injectors without direct gaseous fuel injectors. The sequence of FIG. 5 may be provided by the system of FIG. 1 according to the method of FIG. 7. Vertical markers are shown at times $T_0$-$T_5$ to identify particular times of interest during the sequence.

The first plot from the top of FIG. 5 represents engine intake manifold pressure versus time. The Y axis represents engine intake manifold pressure and intake manifold pressure increases in the direction of the Y axis arrow. The X axis represents time and time increases from the left side of FIG. 5 to the right side of FIG. 5. Horizontal marker 502 represents ambient air pressure. Pressure above ambient pressure is above horizontal marker 502. Pressure below ambient pressure is below horizontal marker 502.

The second plot from the top of FIG. 5 represents liquid fuel injection amount versus time. The Y axis represents the amount of liquid fuel injected to the engine and the amount of liquid fuel injected increases in the direction of the Y axis arrow. The X axis represents time and time increases from the left side of FIG. 5 to the right side of FIG. 5.

The third plot from the top of FIG. 5 represents gaseous fuel injection amount injected to the engine via a port gaseous fuel injector versus time. The Y axis represents an amount of gaseous fuel injected via a port or central injector. The amount of gaseous fuel injected to the engine increases in the direction of the Y axis arrow. The X axis represents time and time increases from the left side of FIG. 5 to the right side of FIG. 5.

The fourth plot from the top of FIG. 5 represents the state of port gaseous fuel injector deactivation and whether or not the port gaseous fuel injector is deactivated. The Y axis represents the operating state of the port gaseous fuel injector. The port gaseous fuel injector is active when the signal is at a low level. The port gaseous fuel injector is deactivated when the signal is at a higher level. The X axis represents time and time increases from the left side of FIG. 5 to the right side of FIG. 5.

The fifth plot from the top of FIG. 5 represents gaseous fuel rail/storage tank pressure versus time. The Y axis represents fuel pressure within the fuel pressure in the gaseous fuel storage tank and fuel pressure increases in the direction of the Y axis arrow. The X axis represents time and time increases from the left side of FIG. 5 to the right side of FIG. 5. Horizontal marker 504 represents a threshold tank pressure where liquid fuel injection is activated to provide desired combustion in the engine. In one example, horizontal marker 504 represents a fuel pressure where less than a desired amount of gaseous fuel flows to the engine than desired to provide a desired level of engine torque. The gaseous fuel pressure is at ambient pressure when the gaseous fuel pressure reaches the X axis.

At time $T_0$, engine intake manifold pressure is relatively low indicating a low engine load. The liquid fuel injection amount is substantially zero and the engine is operated solely with gaseous fuel, although the engine may have operated earlier in time with liquid fuel (e.g., during engine starting). The gaseous fuel injector is activated as indicated by the gaseous fuel injector deactivation status. The amount of gaseous fuel stored in the gaseous fuel tank is at a higher level.

Between time $T_0$ and time $T_1$, engine intake manifold pressure increases indicating that the engine is being operated at a higher engine load. The amount of gaseous fuel injected into the engine intake manifold or cylinder intake port increases as the engine intake manifold pressure increases so that the desired engine torque may be provided. The port gaseous fuel injector remains active and the pressure in the gaseous fuel tank decreases as gaseous fuel is consumed by the engine.

At time $T_1$, the intake manifold pressure reaches a higher pressure where the gaseous fuel injector is deactivated. The gaseous fuel injector may be deactivated so that engine output may be further increased when additional air is allowed to flow into the engine to be combined with liquid fuel. Additional air flows to the engine when the port or central gaseous fuel injector is deactivated because volume in the intake manifold is not displaced by the gaseous fuel. Thus, the amount of liquid fuel injected increases between time $T_1$ and time $T_2$ to increase engine output to meet a desired engine torque. The gaseous fuel injector is operable and not in a deactivated state when engine intake manifold pressure is elevated. The gaseous fuel tank pressure continues to be reduced as gaseous fuel is consumed. In some instances when the engine output is high, a combination of liquid and gaseous fuel may be delivered to produce a desired engine torque.

At time $T_2$, the engine intake manifold pressure is reduced to a level where the gaseous fuel injector output increases and where the liquid fuel injector is deactivated. The gaseous fuel injector remains active and the gaseous fuel tank pressure continues to decrease as the gaseous fuel is consumed.

Between time $T_2$ and time $T_3$, intake manifold pressure increases and decreases with engine load. The engine load may increase or decrease in response to a driver demand torque. The gaseous fuel injector remains active and gaseous fuel is injected to the engine. The amount of gaseous fuel stored in the gaseous fuel storage tank continues to decrease as gaseous fuel is consumed by the engine.

At time $T_3$, pressure of the gaseous fuel stored in the gaseous fuel tank decreases to a level less than the predetermined threshold tank pressure indicated by horizontal marker 504 (e.g. 250 psi). At pressures below the threshold tank pressure indicated by horizontal marker 504, less than a desired amount of fuel may flow from the gaseous fuel storage tank to the engine. The threshold tank pressure indicated by horizontal marker 504 may vary for different operating conditions. For example, the threshold tank pressure indicated by horizontal marker 504 may increase as engine intake manifold pressure increases. Conversely, in some embodiments, when the gaseous fuel tank pressure decreases below the threshold tank pressure indicated by horizontal marker 504, the fuel rail pressure may also fall in response to the decreased tank pressure. For example, when gaseous fuel is the sole source of fuel, a drop in the fuel rail pressure results from a drop in tank pressure since the tank pressure also corresponds to the pressure in the high pressure fuel line and the injection pressure.

The port or central gaseous fuel injector remains active and gaseous fuel continues to flow to the engine at time $T_3$. However, the amount of gaseous fuel supplied to the engine is augmented by injecting liquid fuel to the engine. Thus, the liquid fuel injector is activated to supply fuel to the engine cylinder. In this way, combustion stability and air-fuel ratio control may be controlled to desirable levels. Additionally, as intake manifold pressure increases with increasing engine load, less gaseous fuel is able to be introduced to the engine intake manifold. Therefore, the amount of liquid fuel as a percentage of both fuels entering the engine is increased as intake manifold pressure increases. As intake manifold pressure decreases with engine load more gaseous fuel can be introduced to the engine and as such the percentage of liquid fuel injected to the engine decreases. An oxygen sensor in the engine exhaust system may be used to correct the liquid fuel amount so that the combined mixture of gaseous and liquid fuel provides a desired air-fuel mixture when combined with air entering engine cylinders. Pressure of gaseous fuel stored in the gaseous storage tank continues to decrease as gaseous fuel is consumed by the engine.

At time $T_4$, the engine intake manifold pressure increases to a level greater than ambient air pressure and so the port or central gaseous fuel injector is deactivated and gaseous fuel flow into the engine temporarily ceases. Deactivating the gaseous fuel injector reduces the possibility of ambient air entering the gaseous storage tank when intake manifold pressure is high. In this way, air may be prevented from entering the storage tank at higher intake manifold pressures and lower storage tank pressures. The intake manifold pressure may reach pressures higher than ambient pressure when a compressor pressurizes air entering the engine.

Shortly after time $T_4$, the engine intake manifold pressure decreases to a level less than ambient pressure and the gaseous fuel injector is reactivated. Since the intake manifold pressure is lower than ambient pressure, the engine intake manifold may assist the flow of gaseous fuel from the storage tank to the engine. Thus, pressure of fuel in the gaseous storage tank may be reduced with assistance provided by a low pressure in the engine intake manifold. The liquid fuel injector continues to provide fuel to the engine as the amount of gaseous fuel continues to decrease.

At time $T_5$, pressure in the gaseous storage tank is reduced to ambient pressure and the gaseous fuel injector is deactivated so as to prevent ambient air from entering the gaseous storage tank. Further, deactivating the gaseous fuel injector when pressure of the gaseous fuel tank reaches ambient pressure prevents a vacuum from forming in the gaseous storage tank so that no flow is induced between atmosphere and the gaseous fuel tank. The liquid fuel injector solely provides fuel to the engine after time $T_5$, and the liquid fuel amount is related to the engine load which can be reflected in the engine intake manifold pressure. In other examples, the gaseous storage tank may be reduced to a predetermined vacuum, if desired. In this way, pressure in the gaseous fuel tank may be reduced so that substantially all the fuel in the gaseous storage tank may be used to provide energy to operate the engine. Further, a smooth operating transition between operating the engine solely using gaseous fuel to operating the engine solely using liquid fuel is provided in this way.

Figure 6:
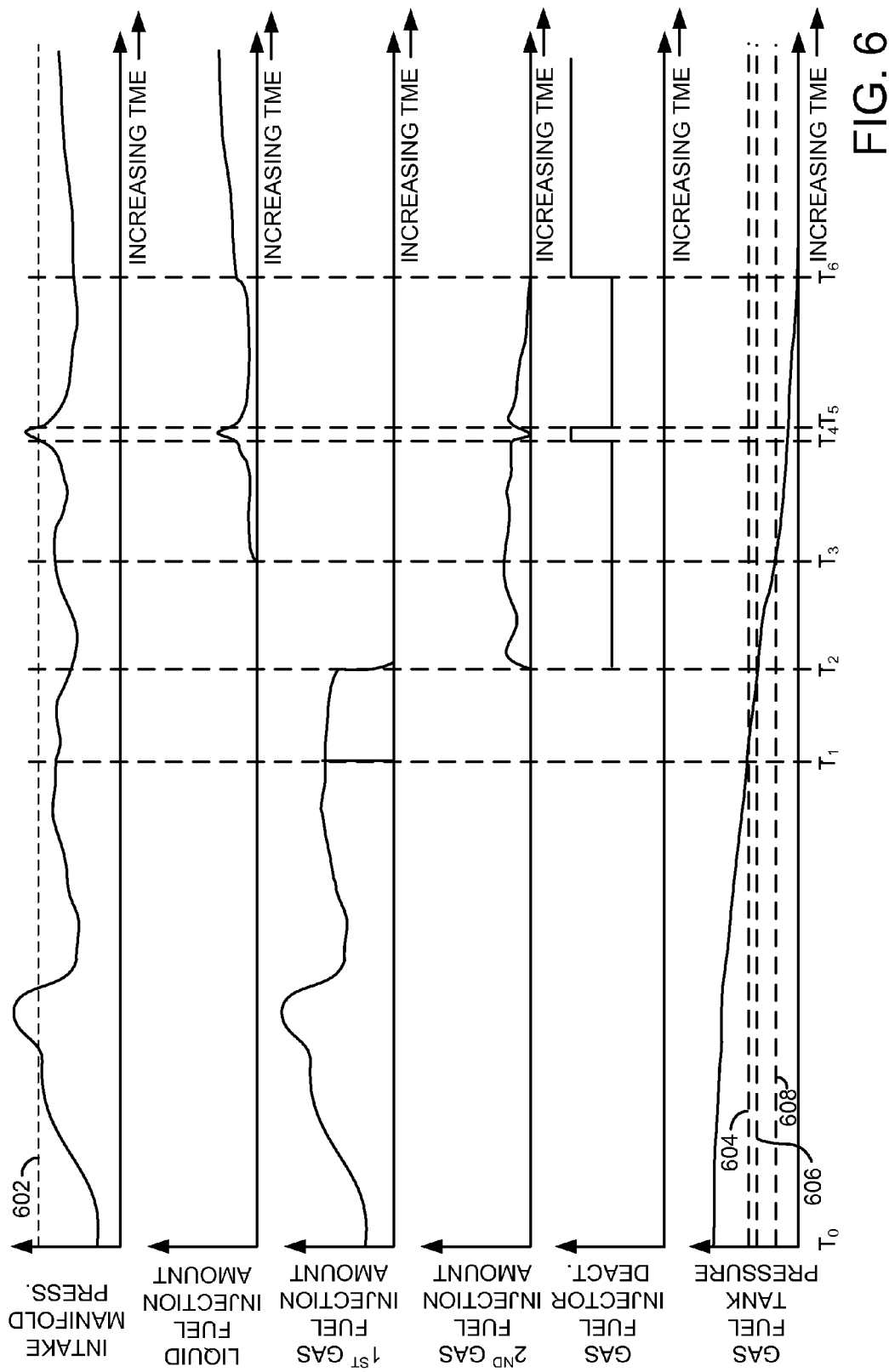

Referring now to FIG. 6, a second simulated operating sequence according to the method of FIG. 7 is shown. The sequence of FIG. 6 includes plots similar to those shown in FIG. 5. Therefore, description of similar plots is omitted for the sake of brevity. Differences between the figures are described. The sequence of FIG. 6 may be provided by the system of FIG. 1 according to the method of FIG. 7. Vertical markers are shown at times $T_0$-$T_6$ to identify particular times of interest during the sequence.

The example in FIG. 6 differs from the example in FIG. 5 in that the engine has gaseous fuel directly injected. Direct injection requires a fairly high injection pressure if the injection occurs after the intake valve is closed, thus leaving more pressure in the tank than may be desired during refilling. This example transitions the fueling from direct gaseous injection after IVC to direct injection before IVC and then perhaps PFI or CFI afterward. As gaseous fuel delivery limitations are encountered, gaseous fuel is augmented with liquid fuel. Further, the intake valve timing can be altered to increase engine vacuum, thus enabling further evacuation of the gaseous fuel tank.

The third plot from the top of FIG. 6 shows an amount of gaseous fuel injected via a $1^{st}$ gaseous direct fuel injector into a cylinder of an engine. The Y axis represents an amount of gaseous fuel injected to the engine via a gaseous direct fuel injector. The gaseous fuel amount increases in the direction of the Y axis arrow. The X axis represents time and time increases from the left side of FIG. 6 to the right side of FIG. 6.

The fourth plot from the top of FIG. 6 shows an amount of gaseous fuel injected via a 2nd gaseous port or central fuel injector into an engine intake system. The Y axis represents an amount of gaseous fuel injected to the engine via a gaseous port or central fuel injector. The gaseous fuel amount increases in the direction of the Y axis arrow. The X axis represents time and time increases from the left side of FIG. 6 to the right side of FIG. 6.

The fifth plot from the top of FIG. 6 represents a signal that indicates deactivation of gaseous fuel injectors. The direct gaseous fuel injector is deactivated when the signal is at a mid level. Both the direct gaseous fuel injector and the port or central fuel gaseous injector are deactivated when the signal is at a higher level. Both the direct gaseous fuel injector and the port or central fuel gaseous injector are active when the signal is at a lower level, but not necessarily injecting gaseous fuel.

Horizontal marker 602 represents ambient pressure. A pressure above horizontal marker 602 is higher than ambient pressure. A pressure below horizontal marker 602 is lower than ambient pressure. Horizontal marker 604 represents a first threshold tank pressure where engine operation is adjusted to continue to allow the direct gaseous fuel injector to continue to inject gaseous fuel to the cylinder. Horizontal marker 606 represents a second threshold tank pressure where the direct gaseous fuel injector is deactivated. Horizontal marker 608 represents a third threshold tank pressure where injection of liquid fuel commences as gas flow through the port or central fuel injector slows but continues.

At time $T_0$, the intake manifold pressure is low indicating the engine is operating at a low load. The liquid fuel injector is not injecting fuel to the engine and neither is the port or central gaseous fuel injector. The direct gaseous fuel injector is providing fuel to the engine, and pressure in the gaseous storage tank is relatively high.

Between time $T_0$ and time $T_1$, the engine intake manifold pressure increases and decreases with engine load. The direct gaseous fuel injector is delivered fuel at a pressure that allows direct injection to the engine during the compression stroke. The air entering the engine may be compressed via a compressor. The intake valve of a cylinder receiving gaseous fuel may open with ±20 crankshaft degrees of top-dead-center intake stroke during this time. The pressure in the gaseous fuel tank decreases as the engine continues to operate.

At time $T_1$, the pressure in the gaseous storage tank reaches the first threshold tank pressure and engine operation is adjusted to allow injection of fuel through the direct gaseous fuel injector to continue. In one example, the fuel injection timing moves from during the compression stroke to during the intake stroke when pressure in the cylinder is lower. As a result, fuel continued to flow through the direct gaseous fuel injector. Further, the intake valve opening time can be retarded to later than 20 crankshaft degrees after top dead center intake stroke so as to lower pressure in the cylinder during fuel injection.

At time $T_2$, the pressure in the gaseous storage tank reaches the second threshold tank pressure where the direct gaseous fuel injector is deactivated and fuel begins to flow through the port or central gaseous fuel injector. Since intake manifold vacuum may be low, gaseous fuel injection through the central gaseous fuel injector begins to further drain the storage tank. Gaseous fuel continues to drain through the central or port gaseous fuel injector between time $T_2$ and $T_3$.

At time $T_3$, the pressure in the gaseous storage tank reaches a third threshold tank pressure where the liquid fuel injector begins to inject liquid fuel to the engine so as to promote stable combustion when there may be insufficient pressure in the gaseous storage tank to operate the engine at a torque desired by a driver. Gaseous fuel also continues to flow to the engine at a lower rate further emptying the gaseous storage tank.

At between time $T_4$ and time $T_5$, intake manifold pressure increases to a level greater than ambient pressure. The port or central gaseous fuel injector is temporarily deactivated and gaseous fuel flow to the engine is stopped. Gaseous fuel injection to the engine continues after time $T_5$.

At time $T_6$, pressure in the gaseous storage tank reaches ambient pressure and both the direct and port gaseous fuel injectors are deactivated. Liquid fuel continues to be injected to the engine based on engine load.

Thus, in some examples, both direct and port gaseous fuel injectors may be operated to empty the gaseous fuel storage tank. Although FIGS. 5 and 6 mention gaseous fuel injectors, the description is not limited to gaseous fuels and applies to other gases such as nitrous oxide.

Referring now to FIG. 7, a flow chart of an example method for emptying a pressurized tank is shown. The method may be stored as executable instructions in non-transitory memory in a controller and system as is shown in FIG. 1. The method may provide the sequences of FIGS. 5 and 6.

At 740, method 700 includes a means of determining whether a diagnostic code has been set in response to a leak in the gaseous fuel system. If controller 12 determines a diagnostic code indicative of a leak is set, then the excess flow valve may also be closed to restrict the flow of gas from the fuel storage tank. Because the flow of gas is shut-off, method 700 further includes a means of operating the fuel delivery system in a default mode, which is indicated at 742. When operating in the default mode, controller 12 turns on fuel pump 248 to deliver liquid fuel 244 from liquid fuel tank 240 to fuel rail 67 in order to power engine 10. Returning to 740, if controller 12 determines that no diagnostic code indicative of a leak is set, fuel supply system 200 may continue to operate as designed and deliver fuel based on the amount of gaseous fuel left in fuel tank 91 and driver demand torque.

At 702, method 700 determines engine operating conditions. Engine operating conditions may include but are not limited to engine speed, engine load, gaseous fuel pressure, ambient temperature, and engine coolant temperature. Method 700 proceeds to 704 after engine operating conditions are determined.

At 704, method 700 judges whether or not the engine includes direct gaseous fuel injectors. The engine fuel injector configuration may be stored in memory. If method 700 judges that the engine includes direct gaseous fuel injectors, the answer is yes and method 700 proceeds to 706. Otherwise, the answer is no and method 700 proceeds to 720.

At 706, method 700 judges whether or not a pressure of the gaseous fuel is greater than a first threshold tank pressure. If method 700 judges the gaseous fuel pressure is greater than the first threshold tank pressure, the answer is yes and method 700 proceeds to 714. Otherwise, the answer is no and method 700 proceeds to 708. The gaseous fuel pressure may be sensed within a gaseous storage tank or along a conduit or passage between the storage tank and the engine. In one example, the gaseous fuel pressure is determined within a fuel rail at a location downstream of a pressure regulator.

At 714, method 700 operates the engine via injecting gaseous fuel through a direct gaseous fuel injector. The direct gaseous fuel injector injects gaseous fuel during at least a portion of a compression stroke; however, start of gaseous fuel injection may begin late in the intake stroke (e.g., 20 crankshaft degrees before bottom-dead-center intake stroke). The intake valve timing is also set to base valve timing where the intake valve opens ±20 crankshaft degrees of top-dead-center intake stroke. Method 700 proceeds to 716 after gaseous fuel injection time is determined and delivered.

At 716, method 700 deactivates liquid fuel injection (e.g., gasoline fuel injection). The liquid fuel injection is deactivated so as to conserve liquid fuel. In one example, liquid fuel may be conserved for cold starting the engine. Thus, the engine may start using liquid fuel and then transition to operating solely using gaseous fuel. Method 700 proceeds to exit after injection of liquid fuel is deactivated.

At 708, method 700 adjusts direct gaseous fuel injection to inject a majority of gaseous fuel during the intake stroke of the cylinder. For example, 80% of the gaseous fuel injected during a cylinder cycle may be injected during an intake stroke of the cylinder. Additionally, the amount of engine torque may be limited to less than a threshold amount of torque in this mode since gaseous fuel displaces fresh air from a portion of the cylinder volume while the intake valve is open. If driver demand torque is greater than the threshold engine torque, injection of liquid fuel may be activated to provide the desired driver torque. Additionally, in one example, intake valve opening (IVO) time is adjusted to late in the intake stroke (e.g., delayed until at least later than 20 crankshaft degrees after top-dead-center intake stroke). In other examples, IVO may be delayed later than 90 crankshaft degrees after top-dead-center intake stroke. Method 700 proceeds to 710 after direct gaseous fuel injection timing and intake valve timing are adjusted.

At 710, method 700 judges whether or not gaseous fuel pressure is greater than a second threshold tank pressure. If so, the answer is yes and method 700 proceeds to exit and fuel is directly injected and intake valve timing are adjusted according to 708. Otherwise, the answer is no and method 700 proceeds to 712.

At 712, method 700 deactivates the direct gaseous fuel injectors and injection of gaseous fuel directly into the engine cylinder ceases. The direct gaseous fuel injector may be deactivated by simply commanding the direct gaseous fuel injector off. Method 700 proceeds to 720 after the direct gaseous fuel injector is deactivated.

At 720, method 700 activates port or centrally injected gaseous fuel injection when port or central gaseous fuel injection is available. Port or central gaseous fuel injection may be available with liquid and direct gaseous fuel injection as shown in FIG. 1. Further, the fuel injection system may include port or central gaseous fuel injection and liquid fuel injection without direct gaseous fuel injection. Method 700 proceeds to 722 after port or central gaseous fuel injectors are activated. At 722, method 700 judges whether or not gaseous fuel pressure in the gaseous fuel storage tank or in the fuel rail is greater than a third threshold tank pressure. If so, the answer is yes and method 700 proceeds to 724. If not, the answer is no and method 700 proceeds to 726.

At 724, method 700 injects gaseous fuel via the port or central fuel injector based on engine operating conditions (e.g., engine speed and load). Further, the engine valve timing may be set to base valve timing where the intake valves open within ±20 crankshaft degrees of top-dead-center intake stroke. In some examples, liquid fuel injection may be activated when driver demand torque is greater than a threshold so that the engine may meet the driver demand torque. Method 700 proceeds to exit after port or central gaseous fuel injectors supply gaseous fuel to the engine according to engine operating conditions.

At 726, method 700 activates liquid fuel injection and adjusts a desired exhaust lambda value. The exhaust lambda value is an exhaust oxygen concentration provided by a stoichiometric air-fuel ratio divided by a desired or actual air-fuel ratio. Thus, the engine air-fuel mixture is lean when lambda is greater than 1, and the engine air-fuel mixture is rich when the lambda value is less than 1. Feedback of the lambda value is provided via an oxygen sensor in the exhaust system. In one example, the amount of gaseous fuel entering the cylinder is estimated from the gaseous fuel pressure and the injector on time. If there is insufficient gaseous fuel flow to a cylinder to provide a desired level of engine torque, liquid fuel is injected along with the gaseous fuel to meet the desired engine torque. For example, if a desired engine torque is 200 N-m and the injected gaseous fuel amount can provide 60 N-m, the liquid fuel injector is turned on to provide 140 N-m of torque. The engine air amount is adjusted to provide a desired lambda value via adjusting a position of a throttle or valve timing. Thus, when engine intake manifold pressure is increasing due to increasing engine load, gaseous fuel flow is reduced and liquid fuel flow is increased. Further, when engine intake manifold pressure decreases due to a reduced engine load, a percentage of liquid fuel delivered to the engine relative to the total amount of fuel provided to the engine is decreased. Method 700 proceeds to 728 after the gaseous and liquid fuel amounts are provided.

At 728, method 700 judges whether or not manifold absolute pressure is greater than gaseous fuel pressure in the storage tank or in the fuel rail. If so, the answer is yes and method 700 proceeds to 732. Otherwise, the answer is no and method 700 proceeds to 730.

At 730, method 700 judges whether or not gaseous fuel pressure in the storage tank or fuel rail is within a threshold pressure of ambient pressure. For example, method 700 judges whether or not pressure in the storage tank is within 1 bar of atmospheric pressure. If gaseous fuel pressure is within a threshold pressure of ambient pressure, method 700 proceeds to 732. Otherwise, method 700 proceeds to exit.

At 732, method 700 deactivates gaseous fuel injection to the engine. The gaseous fuel injection may be deactivated by simply commanding the gaseous fuel injector to an off state. The gaseous fuel injector may be deactivated until the gaseous fuel tank is refilled. Method 700 proceeds to exit after gaseous fuel injection is deactivated.

In this way, method 700 may begin gaseous fuel injection via direct injector and transition to injecting gaseous fuel via port or central injectors. Further, method 700 may deactivate all gaseous fuel injectors when pressure in the gaseous fuel storage tank is less than a threshold tank pressure. In this way, engine and gaseous fuel injector operation may be adjusted to reduce an amount of pressure and gaseous fuel in a gaseous fuel storage tank.

Thus, the method of FIG. 7 provides for a method for emptying a tank, comprising: solely supplying a gaseous fuel to an engine when a pressure of the gaseous fuel is greater than a threshold tank pressure; and supplying the gaseous fuel and a liquid fuel when the pressure of the gaseous fuel is less than the threshold tank pressure. In this way, the engine may continue to operate and provide torque while additional gas is drawn from the gaseous fuel storage tank. The method further comprises deactivating a fuel injector that is supplied with the gaseous fuel when engine intake manifold pressure is greater than ambient pressure.

In another example, the method further comprises deactivating the fuel injector that is supplied with the gaseous fuel when a pressure of the gaseous fuel is substantially at ambient pressure. The method also includes where the fuel injector that is supplied with gaseous fuel injects the gaseous fuel into an intake manifold. The method includes where the pressure of the gaseous fuel is within a storage tank. The method also includes where the pressure of the gaseous fuel is within a passage between a storage tank and the engine.

In another example, the method of FIG. 7 provides for a method for emptying a tank, comprising: supplying a gaseous fuel to an engine via a tank; operating the engine with the gaseous fuel and a first valve timing at a first condition when a pressure of the gaseous fuel is greater than a first threshold tank pressure; and operating the engine with the gaseous fuel and a second valve timing at the first condition when the pressure of the gaseous fuel is less than the first threshold tank pressure. In this way, intake valve timing can be adjusted to increase an amount of vacuum in a cylinder thereby inducing flow from the gaseous storage tank to the engine.

The method includes where the first condition is an engine speed and load. The method also includes where an intake valve of the engine opens later relative to a crankshaft position when the pressure of the gaseous fuel is less than the first threshold tank pressure as compared to when the intake valve opens when the pressure of the gaseous fuel is greater than the first threshold tank pressure. The method further comprises injecting the gaseous fuel to a cylinder of the engine during an intake stroke of the cylinder when the pressure of the gaseous fuel is less than the first threshold tank pressure. The method further comprises injecting the gaseous fuel to the cylinder of the engine during a compression stroke of the cylinder when the pressure of the gaseous fuel is greater than the first threshold tank pressure. The method further comprises directly injecting the gaseous fuel into a cylinder of the engine via an injector, and deactivating the injector when a pressure in the tank is substantially at ambient pressure.

In yet another example, the method of FIG. 7 provides for a method for emptying a tank, comprising: supplying a gaseous fuel to an engine via a tank; operating the engine with a first gaseous fuel injector when a pressure of the gaseous fuel is greater than a first threshold tank pressure; and operating the engine with a second gaseous fuel injector when the pressure of the gaseous fuel is less than the first threshold tank pressure. The method includes where the first gaseous fuel injector injects the gaseous fuel directly into a cylinder, and where the second gaseous fuel injector injects the gaseous fuel into an intake manifold. The method also includes where the first gaseous fuel injector is deactivated when the pressure of the gaseous fuel is less than the first threshold tank pressure. The method also includes where the second gaseous fuel injector is deactivated when the pressure of the gaseous fuel is substantially ambient pressure.

In another example, the method further comprises activating a liquid fuel injector when the pressure of the gaseous fuel is less than a second threshold tank pressure. The method further comprises adjusting an engine air-fuel ratio in response to an output of an oxygen sensor via adjusting injection timing of the liquid fuel injector. The method further comprises retarding opening timing of an intake valve of the engine in response to the pressure of the gaseous fuel while the first gaseous fuel injector is activated and while the second gaseous fuel injector is not activated. The method further comprises deactivating the second gaseous fuel injector when a pressure of an intake manifold is greater than ambient pressure. Although some examples describe injecting a gaseous fuel, it should be understood that other gases not comprising a fuel may also be injected as is described herein.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
   emptying a fuel tank by solely supplying a gaseous fuel to an engine when a gaseous fuel tank pressure is high, and supplying the gaseous fuel and a liquid fuel when the gaseous fuel tank pressure is low; and
   overriding the emptying by closing a gaseous fuel tank valve in response to a low pressure downstream of the gaseous fuel tank valve and a high tank pressure.

2. The method of claim 1, further comprising deactivating a fuel injector that is supplied with the gaseous fuel when engine intake manifold pressure is greater than ambient pressure, the overriding further including switching a fuel source.

3. The method of claim 2, further comprising deactivating the fuel injector that is supplied with the gaseous fuel when a pressure of the gaseous fuel is substantially at ambient pressure.

4. The method of claim 3, where the fuel injector that is supplied with gaseous fuel injects the gaseous fuel into an intake manifold.

5. A method for emptying a tank, comprising:
supplying a gaseous fuel to an engine via a tank;
operating the engine with the gaseous fuel and a first valve timing at a first condition when a pressure of the gaseous fuel is greater than a first threshold;
operating the engine with the gaseous fuel and a second valve timing at the first condition when the pressure of the gaseous fuel is less than the first threshold; and
overriding the supplying based on difference of a gaseous fuel tank pressure and a gaseous rail pressure greater than a threshold, wherein the gaseous fuel tank pressure is greater than the gaseous rail pressure.

6. The method of claim 5, where the first condition is an engine speed and load, and wherein the overriding includes closing a gaseous fuel tank valve, the gaseous fuel tank pressure based on a gaseous fuel tank pressure sensor.

7. The method of claim 5, where an intake valve of the engine opens later relative to a crankshaft position when the pressure of the gaseous fuel is less than the first threshold as compared to when the intake valve opens when the pressure of the gaseous fuel is greater than the first threshold.

8. The method of claim 5, further comprising injecting the gaseous fuel to a cylinder of the engine during an intake stroke of the cylinder when the pressure of the gaseous fuel is less than the first threshold.

* * * * *